United States Patent
Schat et al.

(10) Patent No.: US 10,097,287 B1
(45) Date of Patent: Oct. 9, 2018

(54) RF RADAR DEVICE BIST USING SECONDARY MODULATION

(71) Applicant: NXP B.V., Eindhoven (NL)

(72) Inventors: Jan-Peter Schat, Hamburg (DE); Abdellatif Zanati, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/697,776

(22) Filed: Sep. 7, 2017

(51) Int. Cl.
*G01S 13/08* (2006.01)
*H04B 17/19* (2015.01)
*G06F 11/22* (2006.01)

(52) U.S. Cl.
CPC ......... *H04B 17/19* (2015.01); *G06F 11/2284* (2013.01)

(58) Field of Classification Search
CPC ....... H04B 17/19; G06F 11/2284; G01S 7/40; H01Q 23/00; H01Q 1/523
USPC .................. 342/118, 122, 128, 132
See application file for complete search history.

(56) References Cited

U.S. PATENT DOCUMENTS

| | | | |
|---|---|---|---|
| 6,545,634 B1 | 4/2003 | Heide et al. | |
| 6,703,969 B2 | 3/2004 | Winter et al. | |
| 6,707,419 B2 * | 3/2004 | Woodington | B60K 31/0008 342/118 |
| 9,817,109 B2 * | 11/2017 | Saboo | G01S 13/02 |
| 2011/0181458 A1 * | 7/2011 | Feil | G01F 23/284 342/124 |
| 2015/0084808 A1 * | 3/2015 | Vacanti | G01S 7/41 342/122 |
| 2017/0153318 A1 | 6/2017 | Melzer et al. | |

OTHER PUBLICATIONS

Martin et al. "Wide Bandwidth System identification of AC System Impedances by Applying Pertubations to an Existing Converter," Energy Conversion Congress and Exposition (ECCE), Sep. 2001 IEEE, 8 pages.
Laknaur et al., "A Programmable Window Comparator for Analog Online Testing," 25th IEEE VLSI Test Symposium, 2007, 6 pages.
Kim, Byoungho, "Dithering Loopback-Based Prediction Technique for Mixed-Signal Embedded System Specifications," IEEE Transaction on Circuits and Systems II, Express Briefs, vol. 63, No, 2, Feb. 2016, 5 pages.
Melzer et al, "Phase Noise Estimation in FMCW Radar Transceivers Using an Artificial On-Chip Target," IEEE Transactions on Microwave Theory and Techniques, vol. 64, Issue 12, Dec. 2016, 4 pages.

(Continued)

*Primary Examiner* — Sonny Trinh (57) ABSTRACT

Embodiments are provided for a radar device and a method of operating a radar device, the radar device having a transmitter and a receiver, the method including: generating a chirp signal based on a local oscillator (LO) signal, wherein the LO signal is a frequency-modulated continuous-wave (FMCW) signal; secondary modulating the chirp signal to produce an output signal; transmitting the output signal on a transmitting antenna of the radar device; receiving an echo signal on a receiving antenna of the radar device; downmixing an amplified version of the echo signal with the LO signal to produce a low frequency signal; and outputting an error detection signal based on spectral components of the low frequency signal, wherein the spectral components correspond to the secondary modulating.

20 Claims, 5 Drawing Sheets

(56) References Cited

OTHER PUBLICATIONS

Lin et al. "Transmitter Noise Cancellation in Monostatic FMCW Radar," Microwave Symposium Digest, Jun. 2006, IEEE MTT-S International, 4 pages.
Lin et al, "A Ka-Band FMCW Radar Front-End With Adaptive Leakage Cancellation," IEEE Transactions on Microwave Theory and Techniques, vol. 54, No. 12, Dec. 2006, 8 pages.
Melzer et al., "Short-Range Leakage Cancellation in FMCW Radar Transceivers Using an Artificial On-Chip Target," IEEE Journal of Selected Topics in Signal Processing, vol. 9, No. 8, Dec. 2015, 11 pages.

* cited by examiner

RF RADAR DEVICE BIST USING SECONDARY MODULATION

BACKGROUND

Field

This disclosure relates generally to radar systems, and more specifically, to a radar device that implements built-in self-test (BIST) using secondary modulation.

Related Art

Vehicles are often equipped with electronic control systems to assist drivers in controlling the vehicle. Such systems may include radio frequency (RF) radar systems that determine the distance and velocity of objects in the surrounding environment of the vehicle. It is important that RF radar systems are able to detect and address various failure mechanisms, such as transient faults, during runtime operation of the RF radar system, where such failures can be especially disastrous in an automotive environment.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

Figure 1:
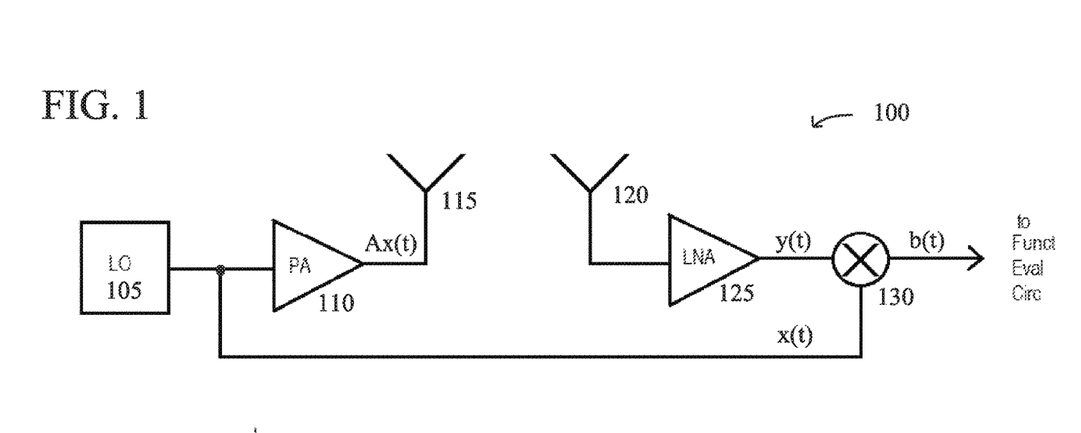
FIG. 1 illustrates a block diagram depicting an example RF radar system.

The electronic control systems implemented in a vehicle are often required to meet stringent automotive safety standards to ensure driver safety. These standards include functional safety standards that require an electronic control system to continue to operate correctly even under failure mode conditions. For example, one failure mechanism is increased crosstalk during functional operation of the electronic control system, such as in a radio frequency (RF) radar system like that shown in FIG. 1. An example RF radar system 100 is shown in FIG. 1 and includes a local oscillator (LO) 105, a power amplifier (PA) 110, and a transmitting (Tx) antenna 115 that implement a transmitter. Radar system 100 also includes a receiving (Rx) antenna 120, a low noise amplifier (LNA) 125, and a mixer 130 that implement a receiver. The components shown in FIG. 1 may also be referred to as an RF block and may be implemented in an integrated circuit (IC). The radar system 100 may also include other components such as control logic, a functional evaluation circuit, and digital signal processing. During functional operation, the transmitter drives an output signal on Tx antenna 115, which backscatters off an object in the range of radar system 100, and an echo signal is received on Rx antenna 120. Tx and Rx antennas 115 and 120 each have a radiation pattern including a main lobe centered on a beam axis of the respective antenna and a number of surrounding side lobes at various angles. Since the echo signal is delayed in time as compared with the transmitter output signal, the RF block outputs a signal indicating the relationship between the echo signal and the transmitter output signal, which is processed by the functional evaluation circuit and provided to digital signal processing to determine information about the object.

Increased crosstalk may occur between the transmitter and receiver due to several factors, such as:

dirt located on the bumper or other part of the vehicle that is covered or overlapped by both a transmitter lobe (such as a main or side lobe) and a receiver lobe (such as a main or side lobe);

a loopback path intended for built-in self-test (BIST) that is intended to be active only during BIST mode, but is activated by mistake in the application mode (during functional operation of the radar system);

a particle in the radar IC or on the printed circuit board (PCB) to which the radar IC is attached, which forms a low-attenuation path from the transmitter to the receiver;

or a phase shifter in the transmitter or receiver path being activated or inactivated by mistake, which leads either to a transmitter lobe (such as a main or side lobe) reaching the receiver, or a receiver lobe (such as a main or side lobe) reaching the transmitter.

These paths may be referred to as unintended direct paths or parasitic paths between the transmitter and the receiver. Generally, the isolation between the transmitter and receiver is in the range of 30 and 40 dB to enable radar operation. However, in some cases, excessive crosstalk caused by such parasitic paths between the transmitter and the receiver may cause the receiver to become saturated and fail to correctly process echo signals that are backscattered from objects in the receiver beam, or cause the noise level at the receiver to be so high that the RF radar system fails to reliably detect existing objects, makes inaccurate measurements of size, distance, or velocity of an existing object, or the likelihood of making false detection of objects that do not exist, or ghost targets, becomes unacceptably high.

In a frequency modulated continuous wave (FMCW) radar system like that shown in FIG. 1, the local oscillator (LO) signal used to implement the chirp signal is the same signal used for mixing down the received echo signal. This means that a crosstalk signal generated from the chirp signal is also mixed down to a low frequency that depends on the slope of the chirp signal (e.g., 2 GHz/30 µs (microseconds)) and the travel time of the chirp signal through the transmitter, the parasitic path, and the receiver. This travel time may be on the order of a few nanoseconds, resulting in the low (or baseband) frequency of the crosstalk signal being a few megahertz (MHz).

It is also noted that such radar systems may experience a high 1/f noise. Such radar systems reduce the high 1/f noise by high-pass filtering the mixed down echo signal (which may be an intermediate frequency (IF) signal) in the receiver. Irrespective of the slope of the chirp ($\Delta f/\Delta t$), the high-pass cut-off frequency is usually chosen such that the echo signals from objects very near to the radar antennas are filtered out. As a result, any low frequency components of the downmixed echo signal that were contributed by the crosstalk signal may be filtered away, which implies that the presence of a parasitic path cannot easily be detected from a received echo signal itself, and that saturation of the receiver cannot be easily detected.

The present disclosure provides for a built-in self-test (BIST) using existing components of a radio frequency (RF) radar system for detecting parasitic signal paths between the transmitter and the receiver, which indicates whether isolation is high enough for proper functional operation of the RF radar system. The BIST is performed during a dedicated self-test mode, which is interleaved with an application mode for functional operation of the RF radar system. During the self-test mode, the chirp signal that is generated by the local oscillator is additionally modulated independent of the frequency modulation of the chirp signal. This additional or secondary modulation can be performed by periodically switching, with a frequency sufficiently above the cut-off frequency of the high-pass filter, a control signal to the transmitter. Examples of such a control signal include:

a phase control signal for a phase shifter or a phase rotator in the transmitter to perform phase modulation of the transmitter output signal;

a gain control signal for a power amplifier or other variable gain amplifier in the transmitter to perform amplitude modulation of the transmitter output signal; and an impedance control signal for impedance matching on a path between the transmitter output and the Tx antenna to perform phase modulation of the transmitter output signal, or other circuitry (e.g., a ball break detector) that can be controlled to alter the impedance of the path or alter the transmit characteristics of the Tx antenna, to perform phase or amplitude modulation of the transmitter output signal.

The resulting twice-modulated transmitter output signal contains frequency components that will be mixed down to frequencies that lie above the cut-off frequency of the high-pass filter.

Example Embodiments

Figure 2:
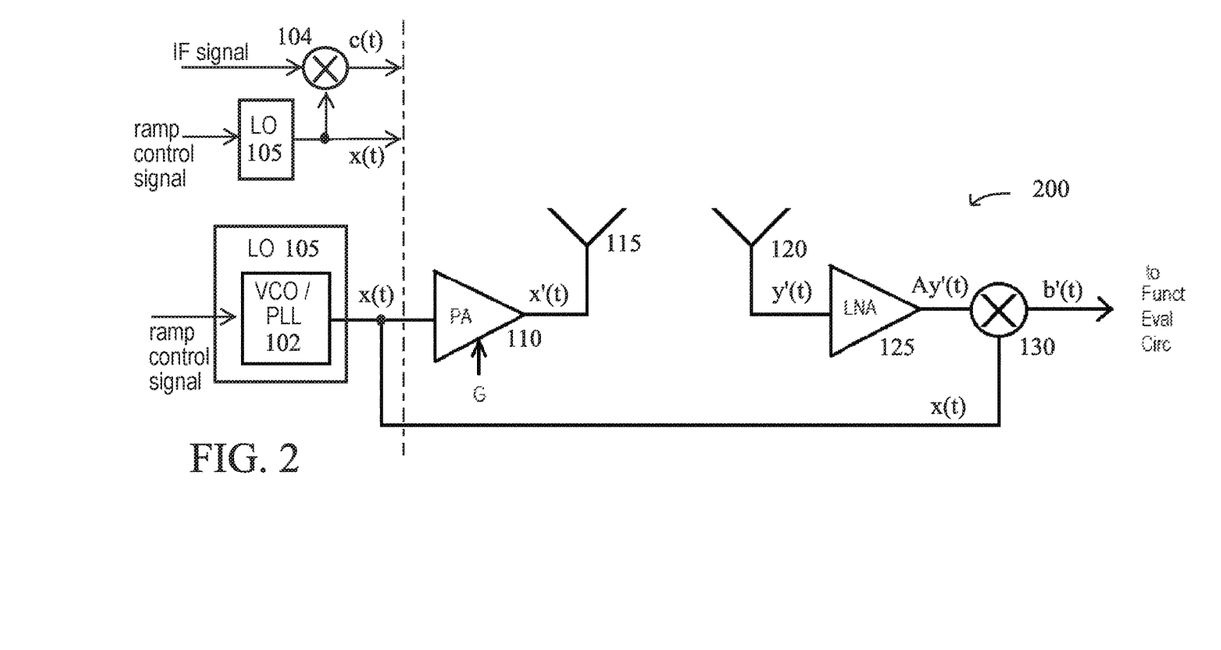
FIGS. 2, 3, and 4 illustrate block diagrams depicting example RF radar systems with built-in self-test (BIST) in which the present disclosure is implemented, according to some embodiments of the present disclosure.

FIG. 2 illustrates a block diagram depicting an example radio frequency (RF) radar system 200 with built-in self-test (BIST). Radar system 200 includes local oscillator (LO) 105, power amplifier (PA) 110, and transmitting (Tx) antenna 115 that implement a transmitter. Radar system 200 includes receiving (Rx) antenna 120, low noise amplifier (LNA) 125, and mixer 130 that implement a receiver. The components shown in FIG. 2 may also be referred to as an RF block of the RF radar system 200, or may be referred to as a transceiver. RF radar system 200 also includes a functional evaluation circuit 725 and digital signal processing 730 (which includes BIST analysis module or circuit 735), as further discussed in connection with FIG. 7.

In the embodiment shown, Tx antenna 115 and Rx antenna 120 are implemented as separate antennas, although a single antenna that serves or functions as both the Tx antenna 115 and Rx antenna 120 may be used in other embodiments (which requires a circulator or other coupling device for connecting the transmitter output to the antenna during a transmission phase and connecting the receiver input to the antenna during a receive phase).

In some embodiments, LO 105 is configured to output an LO signal x(t) that implements the functional chirp or chirp signal x(t), which is shown at the bottom left of FIG. 2. In some embodiments, the LO/chirp signal x(t) is a sinusoidal RF signal having an instantaneous frequency that linearly increases or decreases over time in a periodic manner, where the change in frequency provides periodic cycles used for time reference. In other words, the LO/chirp signal is a frequency-modulated continuous-wave (FMCW) RF signal in some embodiments. In such embodiments, the LO/chirp signal x(t) is provided to PA 110 and is also used to downmix the received echo signal at mixer 130, which would provide a low frequency or baseband signal at the output of mixer 130, as further discussed below. As shown in the bottom left of FIG. 2, LO 105 is implemented using a voltage controlled oscillator (VCO) 102, which may also include a phase locked loop (PLL) in some embodiments. VCO/PLL 102 receives a voltage control signal (or a digital control word in some embodiments) from control logic 715 (further discussed in connection with FIG. 7), which is a periodic ramp control signal that linearly increases or decreases over time, labeled as ramp control signal in FIG. 2. In response, VCO/PLL 102 outputs a sinusoidal RF signal x(t) having an instantaneous frequency that linearly increases or decreases over time, corresponding to the ramp control signal. Examples of the voltage control signal include but are not limited to a sawtooth signal, a triangular signal, or other suitable signal.

In other embodiments, LO 105 is configured to output a dedicated LO signal x(t), which is further mixed with an IF signal to produce chirp signal c(t), which is shown at the top left of FIG. 2. The LO signal x(t) is similarly output by VCO/PLL 102 in response to a ramp voltage control signal (or a digital control word in some embodiments) received from control logic 715, where the dedicated LO signal x(t) is a sinusoidal RF signal having a frequency that linearly increases or decreases over time in a periodic manner, where the change in frequency provides periodic cycles used for time reference. An intermediate frequency (IF) signal may be provided, such as by a functional signal generator. Mixer 104 is configured to use the dedicated LO signal x(t) to upmix or upconvert the IF signal into an RF chirp signal c(t), which is provided to PA 110. The dedicated LO signal x(t) is also used to downmix the received echo signal at mixer 130, which would produce an IF signal at the output of mixer 130. Examples of the periodic ramp signal include but are not limited to a sawtooth signal, a triangular signal, or other suitable signal.

In some embodiments, LO 105 is configured to generate signals in the operational frequency range of 23 GHz to 81 GHz, such as in an operational frequency band around 77 GHz (e.g., with frequency ramping up from 77 GHz to 77.5 GHz) or in an operational frequency band around 24 GHz. An example chirp signal may sweep over 2 GHz in 30 μs (microseconds). Some embodiments of LO 105 may also include a filter (e.g., a bandpass filter) that filters out any unwanted aspects, such as spikes or harmonics, from the generated chirp signal.

Figure 3:
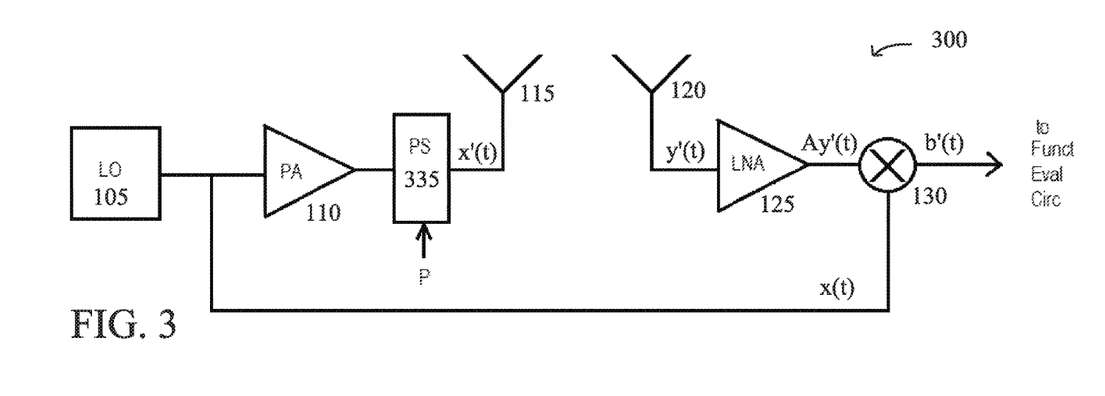
Figure 4:
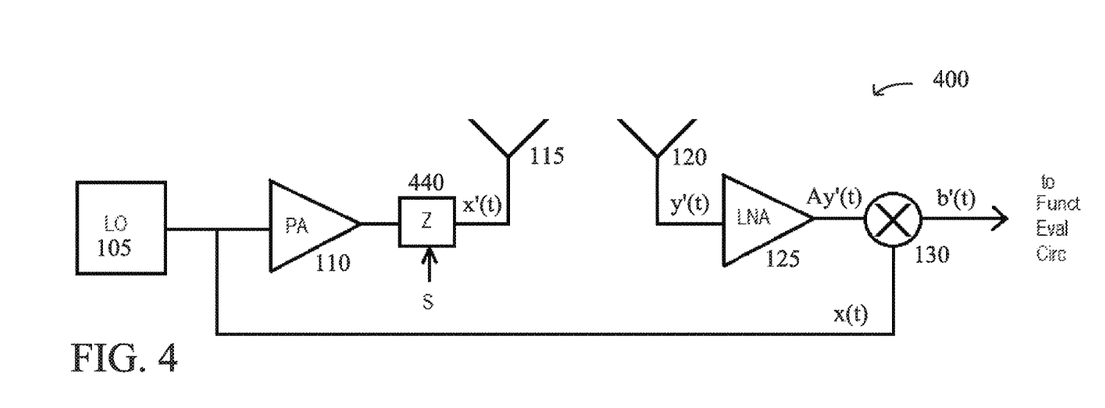

The disclosed RF radar system (including systems 200, 300, and 400) is controlled to operate in either an application mode during which time the RF radar system 200 performs object detection using the above-described chirp signals, or a dedicated built-in self-test or BIST mode during which time RF radar system 200 is controlled to use secondary modulated chirp signals to detect the presence of any parasitic paths. These modes are further discussed below.

During the application mode of the RF radar system 200 (where functional operation of the RF radar system 200 is similar to that shown in FIG. 1), PA 110 is configured to convert the low power (frequency modulated) chirp signal (which may be either signal x(t) or signal c(t), depending on the implementation) into a higher power output signal by some amplification factor A. The output of PA 110 is connected to Tx antenna 115, where PA 110 drives Tx antenna 115 to radiate the output signal continuously for some duration. An object in the surrounding environment within range of the radar system 200 backscatters an echo of the output signal to Rx antenna 120. The signal power of the echo signal at Rx antenna 120 is generally much less than the signal power of the output signal at Tx antenna 115. Rx antenna 120 is connected to an input of LNA 125, which is configured to amplify a very low power signal at its input node by some amplification factor A (which has no relation to the amplification factor A implemented in the transmitter), without significantly degrading its signal-to-noise ratio (SNR). The amplified echo signal is denoted as y(t) at LNA 125 output. The output of LNA 125 is connected to a first input of mixer 130 and the output of LO 105 is connected to a second input of mixer 130, where both signals are RF signals.

Figure 7:
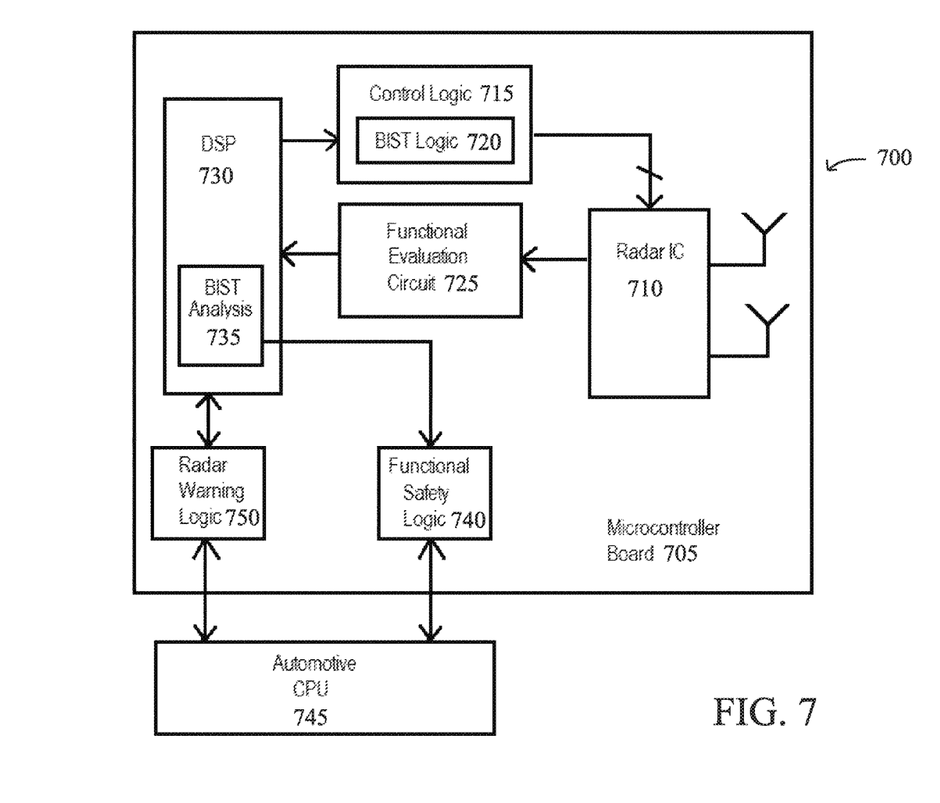
FIG. 7 illustrates a block diagram depicting an example automotive system in which the RF radar system with BIST is implemented, according to some embodiments of the present disclosure.

Mixer 130 is configured to downmix echo signal y(t) using the LO signal x(t), which downconverts the echo signal y(t) into a low frequency signal b(t) having low frequency components in the frequency domain. This low frequency range may be the baseband range from 0 Hz to some higher frequency, where signal b(t) is referred to as a baseband signal (e.g., the demodulated echo signal), or this low frequency range may be an intermediate frequency (IF) signal (or a higher frequency band above the baseband and below the operational RF frequency band). Signal b(t) is provided to a functional evaluation circuit 725 for further filtering (such as high-pass filtering) and processing, in preparation for digital signal processing (DSP) 730 that determines distance and velocity information of the object in the surrounding environment (as shown in FIG. 7). For example, since the echo signal y(t) has traveled from Tx antenna 115 to the object and back to the Rx antenna 120, the echo signal y(t) is delayed in time from the LO signal x(t) by some time difference Δt. This also means that at any given time, there is an instantaneous frequency difference Δf between the echo signal y(t) and the LO signal x(t), which is proportional to the distance to the object (provided that the LO signal x(t) has a linear increase in frequency). Velocity information of the object may also be obtained based on whether a Doppler frequency (caused by the speed of the object) is also present in the echo signal y(t).

During the BIST mode, the disclosed RF radar system 200 is configured to perform secondary modulation on the frequency modulated chirp signal (either x(t) or c(t), depending on the implementation) to generate a twice-modulated output signal x'(t), where the secondary modulation is indicated by the prime notation ('). The secondary modulation is implemented by a component in the transmitter of the RF radar system that receives a control signal at a periodically switched frequency, which controls the component to further modulate (also referred to herein as secondary modulate) the chirp signal to produce the twice-modulated output signal x'(t). The periodic switching frequency is above a high-pass cut-off frequency used by a high-pass filter in the receiver, and may fall anywhere in the MHz range (e.g., 1 MHz to 1000 MHz), or may fall in the kHz range (e.g., 10 kHz to 1000 kHz), depending on the cut-off frequency and the secondary modulation implementation. Embodiments of the secondary modulation include amplitude modulation (as discussed in connection with FIG. 2), or phase modulation (as discussed in connection with FIGS. 3 and 4).

Returning to the radar system shown in FIG. 2, PA 110 is further configured to secondary modulate the chirp signal (simultaneously with amplifying the chirp signal) into the twice-modulated output signal x'(t) during the BIST mode. In one embodiment, PA 110 receives a gain control signal G from control logic 715, which modulates or periodically switches the gain control signal at the periodic switching frequency as PA 110 is amplifying the chirp signal. In other embodiments, PA 110 may receive a modulated or periodically switched bias current, or other control signal that can change the transmitter amplitude quickly. In the embodiment shown, the resulting output signal x'(t) is both frequency modulated and amplitude modulated. In other embodiments that do not use a frequency modulated chirp signal x(t), the resulting output signal x'(t) may only be an amplitude modulated signal, which will contain components of higher and lower frequencies than a non-modulated signal.

PA 110 drives Tx antenna 115 to radiate the output signal x'(t) continuously for some duration, and an object in the surrounding environment within range of the radar system 200 backscatters an echo of the output signal to Rx antenna 120. As a result, the echo signal y'(t) is also twice-modulated or secondary modulated. LNA 125 amplifies the echo signal, which is denoted as Ay'(t) at LNA 125 output. The output of LNA 125 is connected to a first input of mixer 130 and the output of LO 105 is connected to a second input of mixer 130.

Mixer 130 is configured to downmix the amplified echo signal y'(t) using the LO signal x(t), which downconverts the echo signal into a low frequency signal b'(t). Since the echo signal y'(t) and LO signal x(t) have the same frequency modulation, these signals downmix to low frequency components in the low frequency signal b'(t), which may be considered to be a demodulated echo signal b'(t). However, the low frequency signal b'(t) also includes spectral components in the frequency domain that correspond to the secondary modulation, as indicated by the prime notation ('). In the embodiment shown that implements amplitude modulation as the secondary modulation, the low frequency signal should include component frequencies within an expected frequency range that correspond to the known amplitude modulation of the original chirp signal. However, crosstalk from parasitic paths introduces amplitude noise to the received echo signal, which in turn alters the component frequencies of the low frequency signal b'(t) by a detectable amount. The analysis of the spectral components of the low frequency signal b'(t) is further discussed below in connection with FIG. 7.

FIG. 3 shows another embodiment of RF radar system 300 with built-in self-test (BIST). It is noted that LO 105 of RF radar system 300 may also be implemented as either the top left or top right embodiment as shown in FIG. 2, discussed above. The radar system 300 operates in either the application mode (which operates as similarly discussed above) or the BIST mode to detect any parasitic paths. In the embodiment shown, the secondary modulation is implemented as phase modulation.

As shown in FIG. 3, PA 110 is configured to amplify the chirp signal (which may be signal x(t) or c(t), depending on the implementation), without having its control signals modulated. The output of PA 110 is provided to a phase shifter or phase rotator 335 on the transmitter. Phase shifter (PS) 335 is normally configured to be used for MIMO (multiple input multiple output) radar techniques during functional operation of the radar system 300, which implements phase shifted channel coding at the final transmitter stage to be able to distinguish the various transmitted signals that are output on multiple antennas. PS 335 is "reused" for performing secondary modulation in the present radar system 300.

In one embodiment, PS 335 receives a phase control signal P from control logic 715, which modulates or periodically switches the phase control signal at the periodic switching frequency as PS 335 is outputting the chirp signal. In the embodiment shown, the resulting output signal x'(t) is both frequency modulated and phase modulated. The output signal x'(t) is output on Tx antenna 115.

Mixer 130 is configured to downmix the amplified echo signal y'(t) using the LO signal x(t), which downconverts the echo signal into a low frequency signal b'(t), as described above. The low frequency signal b'(t) also includes spectral components in the frequency domain that correspond to the phase modulation. In the embodiment shown, the low frequency signal b'(t) should have an expected spectral density that corresponds to the known phase modulation of the original chirp signal. However, crosstalk from parasitic paths introduces phase noise to the received echo signal, which in turn alters the spectral density by a detectable amount. The analysis of the spectral components of the low frequency signal b'(t) is further discussed below in connection with FIG. 7.

FIG. 4 shows another embodiment of RF radar system 400 with built-in self-test (BIST). It is noted that LO 105 of RF radar system 400 may also be implemented as either the top left or top right embodiment as shown in FIG. 2, discussed above. The radar system 400 operates in either the application mode (which operates as similarly discussed above) or the BIST mode to detect any parasitic paths. In the embodiment shown, the secondary modulation is implemented as phase modulation.

As shown in FIG. 4, PA 110 is configured to amplify the chirp signal (which may be signal x(t) or c(t), depending on the implementation), without having its control signals modulated. The output of PA 110 is connected to Tx antenna 115 by a path 440 having some impedance Z that is adjustable or configurable. For example, in some embodiments, path 440 includes impedance matching circuitry that may be normally configured to match impedance between the output of PA 110 and Rx antenna 115 during functional operation of the radar system 400, based on a control signal S received from control logic 715. The impedance matching circuitry of path 440 is "reused" for performing secondary modulation in the present radar system 400. It is noted that other circuitry that can be controlled to alter the transmit characteristics of the path 400 (e.g., a ball break detector) may be similarly "reused" in other embodiments to implement secondary modulation.

In one embodiment, impedance matching circuitry of path 440 receives a control signal S from control logic 715, which modulates or periodically switches the control signal at the periodic switching frequency as path 440 conveys the chirp signal. In the embodiment shown, the resulting output signal x'(t) is both frequency modulated and phase modulated. The output signal x'(t) is output on Tx antenna 115.

Similar to the embodiment shown in FIG. 3, the resulting low frequency signal b'(t) should have an expected spectral density that corresponds to the known phase modulation of the original chirp signal, but may have an altered spectral density due to phase noise introduced by crosstalk from parasitic paths. The analysis of the spectral components of the low frequency signal b'(t) is further discussed below in connection with FIG. 7.

Figure 5:
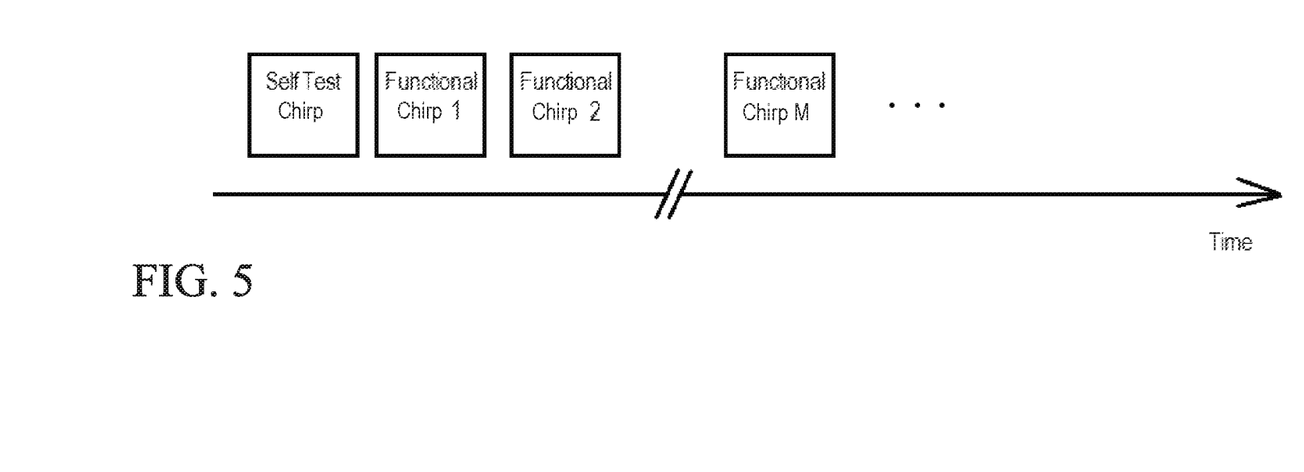
FIGS. 5 and 6 illustrate time diagrams representative of the operation of the RF radar system with BIST like that shown in FIG. 2, 3, or 4, according to some embodiments of the present disclosure.

FIG. 5 shows a timing diagram of operation of the disclosed RF radar system (e.g., as shown in FIGS. 2, 3, and 4). In the embodiment shown, the built-in self-test (BIST) is run in a dedicated BIST mode or self-test mode rather than during functional operation of the RF block, which is referred to as the application mode. The timing diagram shows the dedicated self-test mode as a first or initial block of time, indicating that the BIST is performed at power up or restart of the RF radar device (e.g., when the vehicle is started). During the self-test block, the transmitter drives the Tx antenna with the secondary modulated output signal x'(t), also referred to as a (single) self-test chirp, and the BIST is performed. The application mode (or functional operation) of the RF block is then shown as a sequence of several blocks of time after the self-test block. During the functional operation blocks, the transmitter drives the Tx antenna with the output signal x(t), also referred to as a functional chirp.

Figure 6:
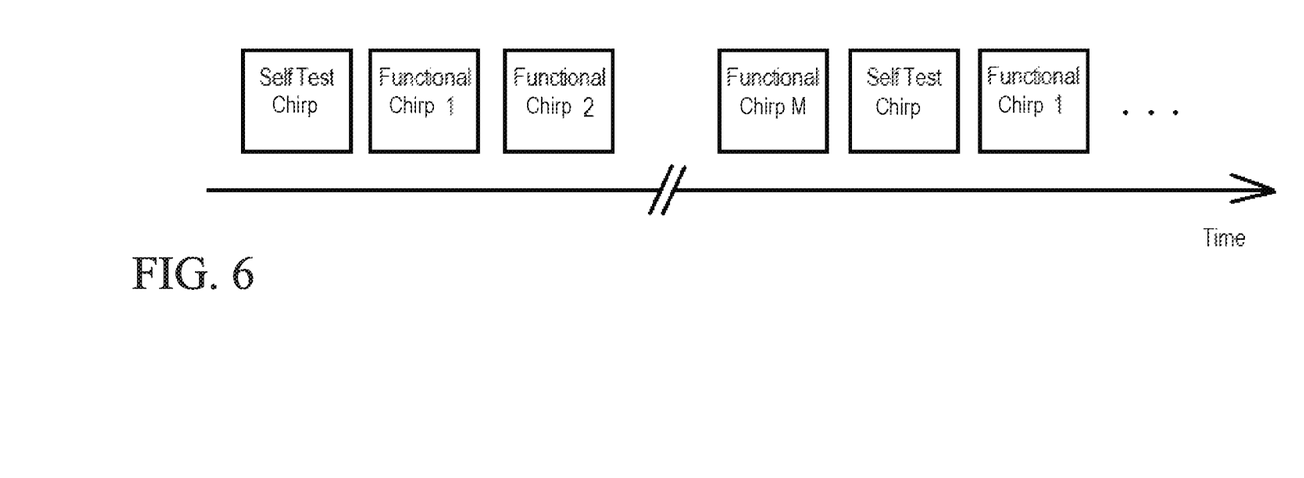

FIG. 6 shows another timing diagram similar to FIG. 5, with the exception that the dedicated self-test mode is interleaved after some Mth functional chirp, and functional operation of the RF block resumes after the BIST is run. The dedicated self-test mode may be repeated in an interleaved manner, such as being run after every Mth number of functional chirps have been transmitted by the RF block (e.g., after 200 chirps), or after a repeating or periodic expiration time (e.g., every 10 ms, or every 100 ms). In some embodiments, BIST (whether implemented according to FIG. 5 or FIG. 6) is intended to be executed shortly before the beginning of a following functional chirp or shortly after the end of the preceding functional chirp, leading to a near-real-time test that is fast enough to detect any transient faults that may cause a disturbance in the functional chirps.

FIG. 7 shows an example automotive system 700 in which a RF radar system like that shown in FIG. 2, 3, or 4 is implemented. In the embodiment shown, the RF block components shown in FIG. 2, 3, or 4 are implemented as a radar integrated circuit (IC) 710, which may be formed as part of a semiconductor die or semiconductor substrate. Such a radar IC 710 may be attached to an underlying carrier substrate such as a microcontroller board 705 or printed circuit board (PCB) to form part of a radar device, where the microcontroller board or PCB 705 includes electrically conductive features on a non-conductive substrate, formed using polyimide or FR4 or BT resin. RF radar system also includes circuitry that implements control logic 715 (which implements BIST logic 720), functional evaluation circuit 725, functional safety logic 740, radar warning logic 750, and digital signal processing (DSP) 730 (which implements BIST analysis 735), which may be attached to the microcontroller board 705 to form a radar device.

DSP 730 implements a radar application, such as implementing frequency modulated continuous wave (FMCW) radar. DSP 730 communicates with control logic 715, which is configured to control the transceiver of radar IC 710 to operate in either an application mode for object detection or a test mode for BIST to detect parasitic paths. During the application mode, DSP 730 may output a digital control word to control logic 715, which in turn may include a digital-to-analog-converter (DAC) that converts the digital control word into an analog signal, such as a voltage control signal. In some embodiments, control logic 715 provides this voltage control signal (or a digital control word in some embodiments) to the PLL or the VCO of LO 105 to produce LO signal x(t) at LO output. Control logic 715 also implements a number of other control signals that control settings of the transmitter and receiver of radar IC 710, such as gain or attenuation. It is noted that in some embodiments, functional evaluation circuit 725 and DSP 730 (including BIST analysis 735) may be implemented together as an application specific integrated circuit (ASIC). Such an ASIC may also include control logic 715 (including BIST logic 720) and functional safety logic 740.

During the test mode, DSP 730 may similarly provide the digital control word to control logic 715 in order to provide the voltage control signal/digital control word to the PLL or the VCO of LO 105 to produce LO signal x(t). Additionally, DSP 730 provides another digital control word to BIST logic 720, which may in turn include a DAC that converts the digital control word into an analog signal to control a component of the transmitter to perform secondary modulation, where the analog signal is periodically switching with a frequency sufficiently above the cut-off frequency of the high-pass filter (either in the receiver or in the functional evaluation circuit, depending on the implementation). Depending on the implementation, BIST logic 720 is configured to output: a phase control signal to a phase shifter or phase rotator in the transmitter to phase modulate the LO signal x(t), a gain control signal to the power amplifier or other variable gain component in the transmitter to amplitude modulate the LO signal x(t), or a control signal to a component in the transmitter that affects impedance of a path between the transmitter output to the Tx antenna to phase modulate the LO signal x(t). As a result, the transmitter generates secondary modulated signal x'(t), which is output on Tx antenna. An echo signal y'(t) is received on Rx antenna, the LO signal x(t) is used to downmix an amplified version of the echo signal y'(t) to produce low frequency signal b'(t).

Radar IC 710 provides a low frequency signal (which is either b(t) or b'(t), depending on the selected mode) to functional evaluation circuit 725. Functional evaluation circuit 725 is configured to process the signal for DSP 730, which may include filtering out unwanted aspects (e.g., spikes, harmonics, noise) and digitizing the signal for DSP 730 using an analog-to-digital-converter (ADC). It is noted that functional evaluation circuit 725 may include a high-pass filter in some embodiments, while the high-pass filter may be included at the output of the receiver on the radar IC 710 in other embodiments. During the application mode, DSP 730 is configured to perform calculations to determine distance and velocity information about an object, such as by using Fast Fourier Transform (FFT) or other suitable algorithm. DSP 730 is communicatively coupled to radar warning logic 750, which may store distance and velocity information and track the various objects detected around the vehicle. Radar warning logic 750 is communicatively coupled to an automotive central processing unit (CPU) 745 and is configured to provide warning indications about the tracked objects to the automotive CPU 745. Automotive CPU 745 may in turn communicate warnings about the tracked objects to the driver of the vehicle through visual displays, audio warnings or chimes, and driver assistance (e.g., decelerating the vehicle or altering the course of the vehicle).

During the BIST mode, DSP 730 provides the low frequency signal b'(t) to BIST analysis 735, which is configured to analyze the low frequency signal b'(t) to determine whether any parasitic paths are present between the transmitter side and the receiver side of the radar IC 710, based on the spectral components of the low frequency signal b'(t). BIST analysis 735 is also configured to output an error detection signal in response to the analysis. BIST analysis 735 may be configured to analyze the spectral components using Fast Fourier Transform (FFT) or other suitable algorithm. It is noted that the isolation of the RF radar system decreases with the presence of parasitic path(s). The isolation of the RF radar system can then be determined from the spectral components of the low frequency signal b'(t), where crosstalk from the parasitic paths alters the spectral components by a detectable amount.

In embodiments when amplitude modulation is implemented as the secondary modulation (e.g., see FIG. 2), the low frequency signal b'(t) includes spectral components in the frequency domain that should correspond to the amplitude modulation. Since the amplitude modulation is known, component frequencies that correspond to the known amplitude modulation are expected to be present in some target band above the high-pass cut-off frequency. However, if one or more parasitic paths are present, the resulting crosstalk from the parasitic paths introduces or adds amplitude noise to the received echo signal, which may cause the component frequencies in the low frequency signal b'(t) to exceed the target band. An expected ceiling threshold can be set above the target band within some tolerance that takes into account low acceptable crosstalk levels that may occur during functional operation of the RF radar system 200. BIST analysis 735 determines whether actual component frequencies of the low frequency signal b'(t) exceed the expected ceiling threshold. BIST analysis 735 outputs an error detection signal that indicates an error is detected when the component frequencies are above the expected threshold.

In embodiments when phase modulation is implemented as the secondary modulation (e.g., see FIG. 3 or 4), the low frequency signal b'(t) includes spectral components in the frequency domain that should correspond to the phase modulation. Since the phase modulation is known, the spectral density of the low frequency signal is expected to have some target value that corresponds to the known phase modulation. Spectral density refers to the power spectral density, or measure of the total signal power in a specified spectral bandwidth divided by the bandwidth. However, if one or more parasitic paths are present, the resulting crosstalk from the parasitic paths introduces or adds phase noise to the received echo signal, which may cause the spectral density of the low frequency signal b'(t) to exceed the target value. An expected ceiling threshold can be set above the target value by some tolerance that takes into account low acceptable crosstalk levels that may occur during functional operation of the RF radar system 200. BIST analysis 735 determines whether the actual spectral density of the low frequency signal b'(t) exceeds the expected ceiling threshold. BIST analysis 735 outputs an error detection signal that indicate an error is detected when the component frequencies are above the expected threshold.

The error detection signal is provided to functional safety logic 740. In some embodiments, functional safety logic 740 is configured to analyze the error detection signal and determine whether a particular error of the RF radar system is indicated. In such embodiments, the error detection signal may be implemented as an error value (or values) that indicates the present analysis of the spectral components, such as the measured value of the spectral density or the measured frequencies of the component frequencies of the low frequency signal b'(t). Functional safety logic 740 may store and track the error values and determine whether an increasing crosstalk trend is occurring even if the error value indicates an error is not yet detected. For example, the isolation of the radar system may be gradually getting worse (e.g., isolation is worsening 1 dB per day), where such increasing crosstalk may be approaching an unacceptable level. In response, functional safety logic 740 may issue a warning to the driver for maintenance of the RF radar system (e.g., check for particles on the RF radar system, or clean the vehicle of particles or dirt that are increasing crosstalk) before the crosstalk causes safety concerns in the RF radar system (e.g., detecting ghost objects, failing to detect real objects).

It is noted that the spectral components in the low frequency signal b'(t) correspond to the transmitter output power, the receiver output power, and impedance matching of the transmitter to a Tx antenna. Since each of these aspects individually contribute to the spectral components, a change in the measured values of the spectral components may indicate that one of these aspects has suffered a disturbance or fault, such as a faulty gain setting, attenuation setting, or impedance setting. For example, defects or faults of the transmitter and receiver, including their mixers and their digital control circuits, may be detected based on a present value of the spectral components as compared to an expected value. Defects or faults of the transmitting and receiving antennas may also be detected since such defects or faults often cause impedance mismatch at the transmitter output or at the receiver input. This mismatch changes the transmitter output power level or the input impedance of the receiver, which changes the power level of the crosstalk signal at the receiver input and in turn changes the value of the spectral components.

Functional safety logic 740 is also communicatively coupled to automotive CPU 745. Functional safety logic 740 is configured to provide further warning indications to the automotive CPU 745, such as provide a present self-test status of the radar system or device based on the error detection signal. Functional safety logic 740 may also be configured to perform a course of action in response to the error detection signal. For example, functional safety logic 740 may determine from the error detection signal that the RF radar system or radar device needs to be restarted, and in response triggers a restart of the radar system or device. Functional safety logic 740 may also communicate a not-ready status to the automotive CPU until the radar system or device is operational. Functional safety logic 740 may also determine that the error detection signal indicates an irreparable failure of the radar system or device (e.g., even after restart), and in response triggers the radar system or device to power down. Functional safety logic 740 may also communicate a failure status of the radar system or device to the automotive CPU, and may further communicate an indication that the automotive CPU needs to switch over to another radar system or device present on the vehicle. Functional safety logic 740 may further monitor other values such as temperature, power supply voltages, PLL lock status, and the like.

Figure 8:
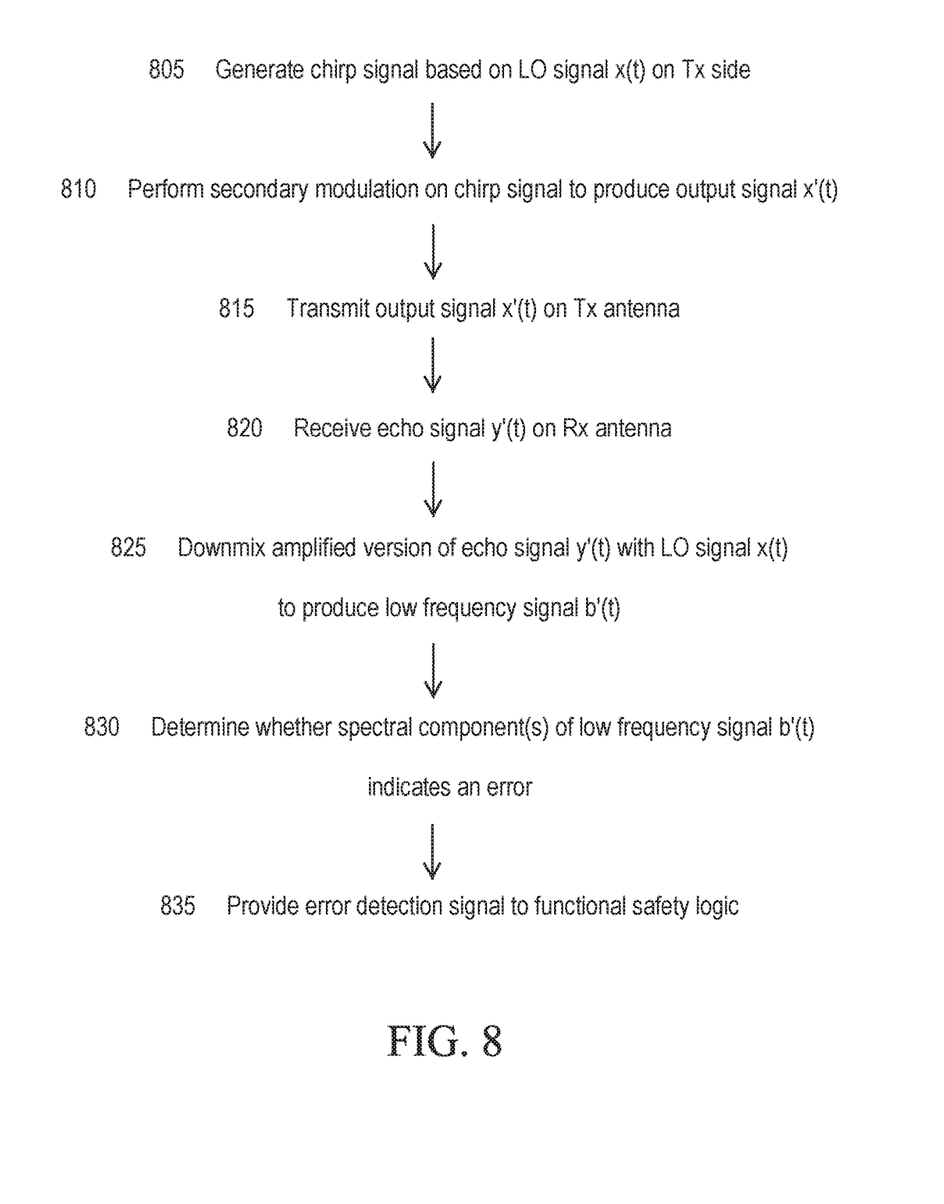
FIG. 8 illustrates a flowchart depicting an example method of operating the RF radar system with BIST, according to some embodiments of the present disclosure.

FIG. 8 illustrates a flowchart depicting an example method of operating the disclosed RF radar system with BIST, as discussed above. The method begins at operation 805, where a chirp signal is generated based on the LO signal x(t) generated on the transmitter (Tx) side of the radar system. It is noted that the LO signal x(t) is a frequency modulated continuous wave (FMCW) signal. The method continues to operation 810, where secondary modulation is performed on the chirp signal (which may be either x(t) or c(t), depending on the implementation) to produce an output signal x'(t). It is noted that the secondary modulation may implement additional amplitude modulation or phase modulation, where the prime notation (') is used to indicate a twice-modulated signal (e.g., FM and AM, or FM and PM). The method continues to operation 815, where the output signal x'(t) is transmitted on Tx antenna. The method continues to operation 820, where an echo signal y'(t) is received on Rx antenna.

The method continues to operation 825, where an amplified version of the echo signal y'(t) is downmixed with LO signal x(t) to produce a low frequency signal b'(t), where the prime notation (') indicates the signal includes spectral components in the frequency domain that correspond to the frequency modulation and the secondary (amplitude or phase) modulation performed on the Tx side. The method continues to operation 830, where spectral components of the low frequency signal b'(t) are analyzed to produce an error detection signal that indicates whether an error is detected. The method continues to operation 835, where the error detection signal is provided to functional safety logic, which performs one or more actions in response to the error detection signal to ensure driver safety.

As noted above, the radar IC may be implemented on a semiconductor die or substrate, which can be any semiconductor material or combinations of materials, such as gallium arsenide, silicon germanium, silicon-on-insulator (SOI), silicon, monocrystalline silicon, the like, and combinations of the above. The active circuitry on the semiconductor die or substrate is formed using a sequence of numerous process steps applied to a semiconductor wafer, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like. Examples of integrated circuit components include but are not limited to a processor, memory, logic, analog circuitry, sensor, MEMS (microelectromechanical systems) device, a standalone discrete device such as a resistor, inductor, capacitor, diode, power transistor, and the like. In some embodiments, the active circuitry may be a combination of the integrated circuit components listed above or may be another type of microelectronic device.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. Furthermore, although the various schematics shown herein depict certain example arrangements of elements, additional intervening elements, devices, features, or components may be present in an actual embodiment (assuming that the functionality of the given circuit is not adversely affected).

By now it should be appreciated that there has been provided a built-in self-test (BIST) solution that is capable of detecting parasitic paths between the transmitter and the receiver in an RF radar system, where the BIST is performed in an interleaved manner with functional operation of the RF radar system, during which time the RF radar system uses a twice-modulated or secondary modulated output signal for detecting crosstalk arising from the parasitic paths that negatively affect isolation of the RF radar system.

In one embodiment, a method for operating a radar device is provided, the radar device having a transmitter and a receiver, the method including: generating a chirp signal based on a local oscillator (LO) signal, wherein the LO signal is a frequency-modulated continuous-wave (FMCW) signal; secondary modulating the chirp signal to produce an output signal; transmitting the output signal on a transmitting antenna of the radar device; receiving an echo signal on a receiving antenna of the radar device; downmixing an amplified version of the echo signal with the LO signal to produce a low frequency signal; and outputting an error detection signal based on spectral components of the low frequency signal, wherein the spectral components correspond to the secondary modulating.

One aspect of the above embodiment provides that the secondary modulating includes phase modulating an amplified version of the chirp signal.

A further aspect of the above embodiment provides that the error detection signal indicates an error is detected when a spectral density of the low frequency signal that corresponds to the phase modulating exceeds an expected threshold.

Another further aspect of the above embodiment provides that the phase modulating includes providing the amplified version of the chirp signal to a phase shifter of the transmitter, providing a periodically switched phase control signal to the phase shifter to produce a phase modulated signal as the output signal.

Another further aspect of the above embodiment provides that the phase modulating includes providing the amplified version of the chirp signal on a transmit path to the transmitting antenna, and providing a periodically switched control signal to impedance-altering circuitry of the transmit path to produce a phase modulated signal as the output signal.

Another aspect of the above embodiment provides that the secondary modulating includes amplitude modulating the chirp signal.

A further aspect of the above embodiment provides that the error detection signal indicates an error is detected when component frequencies of the low frequency signal that correspond to the amplitude modulating exceed an expected threshold.

Another further aspect of the above embodiment provides that the amplitude modulating includes providing the chirp signal to a power amplifier of the transmitter, and providing a periodically switched gain control signal to the power amplifier to produce an amplitude modulated signal as the output signal.

Another aspect of the above embodiment provides that the chirp signal includes the LO signal.

Another aspect of the above embodiment provides that the chirp signal includes an upmixed version of the LO signal.

In another embodiment of the present disclosure, a radar device is provided, which includes: a transmitter configured to generate a chirp signal based on a local oscillator (LO) signal, wherein the LO signal is a frequency-modulated continuous-wave (FMCW) signal; control logic circuitry coupled to the transmitter by a plurality of control signals, wherein the control logic circuitry is configured to provide a periodically switched control signal to the transmitter to secondary modulate the chirp signal to produce an output signal, and wherein the transmitter is further configured to transmit the output signal; a receiver configured to receive an echo signal, the receiver including a mixer configured to downmix an amplified version of the echo signal with the LO signal to produce a low frequency signal; and an analysis circuit configured to output an error detection signal based on spectral components of the low frequency signal, wherein the spectral components correspond to the secondary modulation.

One aspect of the above embodiment provides that the transmitter is controlled to perform phase modulation to produce the output signal, one or more parasitic paths between the transmitter and the receiver introduces phase noise to the echo signal, and the error detection signal indicates an error is detected when a spectral density of the low frequency signal that corresponds to the phase modulation exceeds an expected threshold.

Another aspect of the above embodiment provides that the transmitter further includes: a phase shifter configured to receive an amplified version of the chirp signal, wherein the control logic circuitry is configured to provide a periodically switched phase control signal to the phase shifter to produce a phase modulated signal as the output signal.

Another aspect of the above embodiment provides that the transmitter further includes: a transmit path to a transmitting antenna, wherein the control logic circuitry is configured to provide a periodically switched control signal to impedance-altering circuitry of the transmit path to produce a phase modulated signal as the output signal.

Another aspect of the above embodiment provides that the transmitter is controlled to perform amplitude modulation to produce the output signal, one or more parasitic paths between the transmitter and the receiver introduces amplitude noise to the echo signal, and the error detection signal indicates an error is detected when component frequencies of the low frequency signal that correspond to the amplitude modulation exceed an expected threshold.

Another aspect of the above embodiment provides that the transmitter further includes: a power amplifier configured to output an amplified version of the chirp signal, wherein the control logic circuitry is configured to provide a periodically switched gain control signal to the power amplifier to produce an amplitude modulated signal as the output signal.

Another aspect of the above embodiment provides that the radar device further includes: functional safety logic circuitry communicatively coupled to an automotive processing unit, wherein the functional safety logic circuitry is configured to communicate a present self-test status of the radar device based on the error detection signal received from the analysis circuit.

A further aspect of the above embodiment provides that the secondary modulation of the chirp signal is performed as part of a test mode, and the test mode is performed at one or more of a startup of the radar device, a reset of the radar device, after a predetermined number of functional chirp signals have been transmitted during an application mode of the radar device, and after a periodic expiration time.

Another further aspect of the above embodiment provides that the functional safety logic circuitry is further configured to perform one of a group of actions including: restart the radar device, power down the radar device, communicate a not-ready status to the automotive processing unit, communicate a failure status to the automotive processing unit, and communicate an indication to switch over to another radar device to the automotive processing unit.

Another further aspect of the above embodiment provides that the functional safety logic circuitry is further configured to analyze one or more present values of the spectral components to determine whether a particular error of the radar device is indicated, and the spectral components of the low frequency signal correspond to one or more of a group including: output power of the transmitter, output power of the receiver, and impedance matching of the transmitter to a transmitting antenna.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, the terms "substantial" and "substantially" mean sufficient to achieve the stated purpose or value in a practical manner, taking into account any minor imperfections or deviations, if any, that arise from usual and expected abnormalities that may occur during functional operation of the RF radar device, which are not significant for the stated purpose or value. Also as used herein, the terms "approximately" and "around" mean a value close to or within an acceptable range of an indicated value, amount, or quality, which also includes the exact indicated value itself.

Although the invention is described herein with reference to specific embodiments, various modifications and changes can be made without departing from the scope of the present invention as set forth in the claims below. For example, additional or fewer transmission channels may be implemented in the RF radar system of FIG. 2, 3, or 4. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a radar device, the radar device having a transmitter and a receiver, the method comprising:
   generating a chirp signal based on a local oscillator (LO) signal, wherein the LO signal is a frequency-modulated continuous-wave (FMCW) signal;
   secondary modulating the chirp signal by periodically switching a transmitter component control signal to produce an output signal;
   transmitting the output signal on a transmitting antenna of the radar device;
   receiving an echo signal on a receiving antenna of the radar device;
   downmixing an amplified version of the echo signal with the LO signal to produce a low frequency signal; and
   outputting an error detection signal based on spectral components of the low frequency signal, wherein the spectral components correspond to the secondary modulating.

2. The method of claim 1, wherein the secondary modulating comprises phase modulating an amplified version of the chirp signal.

3. The method of claim 2, wherein the error detection signal indicates an error is detected when a spectral density of the low frequency signal that corresponds to the phase modulating exceeds an expected threshold.

4. The method of claim 2, wherein the phase modulating comprises providing the amplified version of the chirp signal to a phase shifter of the transmitter, providing a periodically switched phase control signal to the phase shifter to produce a phase modulated signal as the output signal.

5. The method of claim 2, wherein the phase modulating comprises providing the amplified version of the chirp signal on a transmit path to the transmitting antenna, and providing a periodically switched control signal to impedance-altering circuitry of the transmit path to produce a phase modulated signal as the output signal.

6. The method of claim 1, wherein the secondary modulating comprises amplitude modulating the chirp signal.

7. The method of claim 6, wherein the error detection signal indicates an error is detected when component frequencies of the low frequency signal that correspond to the amplitude modulating exceed an expected threshold.

8. The method of claim 6, wherein the amplitude modulating comprises providing the chirp signal to a power amplifier of the transmitter, and providing a periodically switched gain control signal to the power amplifier to produce an amplitude modulated signal as the output signal.

9. The method of claim 1, wherein the chirp signal comprises the LO signal.

10. The method of claim 1, wherein the chirp signal comprises an upmixed version of the LO signal.

11. A radar device comprising:
   a transmitter configured to generate a chirp signal based on a local oscillator (LO) signal, wherein the LO signal is a frequency-modulated continuous-wave (FMCW) signal;
   control logic circuitry coupled to the transmitter by a plurality of control signals, wherein the control logic circuitry is configured to provide a periodically switched control signal to the transmitter to secondary modulate the chirp signal to produce an output signal, and wherein the transmitter is further configured to transmit the output signal;

a receiver configured to receive an echo signal, the receiver comprising a mixer configured to downmix an amplified version of the echo signal with the LO signal to produce a low frequency signal; and an analysis circuit configured to output an error detection signal based on spectral components of the low frequency signal, wherein the spectral components correspond to the secondary modulation.

12. The radar device of claim 11, wherein the transmitter is controlled to perform phase modulation to produce the output signal, one or more parasitic paths between the transmitter and the receiver introduces phase noise to the echo signal, and the error detection signal indicates an error is detected when a spectral density of the low frequency signal that corresponds to the phase modulation exceeds an expected threshold.

13. The radar device of claim 11, wherein the transmitter further comprises:

a phase shifter configured to receive an amplified version of the chirp signal, wherein the control logic circuitry is configured to provide a periodically switched phase control signal to the phase shifter to produce a phase modulated signal as the output signal.

14. The radar device of claim 11, wherein the transmitter further comprises:

a transmit path to a transmitting antenna, wherein the control logic circuitry is configured to provide a periodically switched control signal to impedance-altering circuitry of the transmit path to produce a phase modulated signal as the output signal.

15. The radar device of claim 11, wherein the transmitter is controlled to perform amplitude modulation to produce the output signal, one or more parasitic paths between the transmitter and the receiver introduces amplitude noise to the echo signal, and the error detection signal indicates an error is detected when component frequencies of the low frequency signal that correspond to the amplitude modulation exceed an expected threshold.

16. The radar device of claim 11, wherein the transmitter further comprises:

a power amplifier configured to output an amplified version of the chirp signal, wherein the control logic circuitry is configured to provide a periodically switched gain control signal to the power amplifier to produce an amplitude modulated signal as the output signal.

17. The radar device of claim 11, further comprising:

functional safety logic circuitry communicatively coupled to an automotive processing unit, wherein the functional safety logic circuitry is configured to communicate a present self-test status of the radar device based on the error detection signal received from the analysis circuit.

18. The radar device of claim 17, wherein the secondary modulation of the chirp signal is performed as part of a test mode, and the test mode is performed at one or more of a startup of the radar device, a reset of the radar device, after a predetermined number of functional chirp signals have been transmitted during an application mode of the radar device, and after a periodic expiration time.

19. The radar device of claim 17, wherein the functional safety logic circuitry is further configured to perform one of a group of actions including: restart the radar device, power down the radar device, communicate a not-ready status to the automotive processing unit, communicate a failure status to the automotive processing unit, and communicate an indication to switch over to another radar device to the automotive processing unit.

20. The radar device of claim 17, wherein the functional safety logic circuitry is further configured to analyze one or more present values of the spectral components to determine whether a particular error of the radar device is indicated, and the spectral components of the low frequency signal correspond to one or more of a group including: output power of the transmitter, output power of the receiver, and impedance matching of the transmitter to a transmitting antenna.

* * * * *